Aug. 29, 1933.   E. A. SCHUELKE ET AL   1,924,809
LIQUID MEASURING DEVICE
Filed March 23, 1932
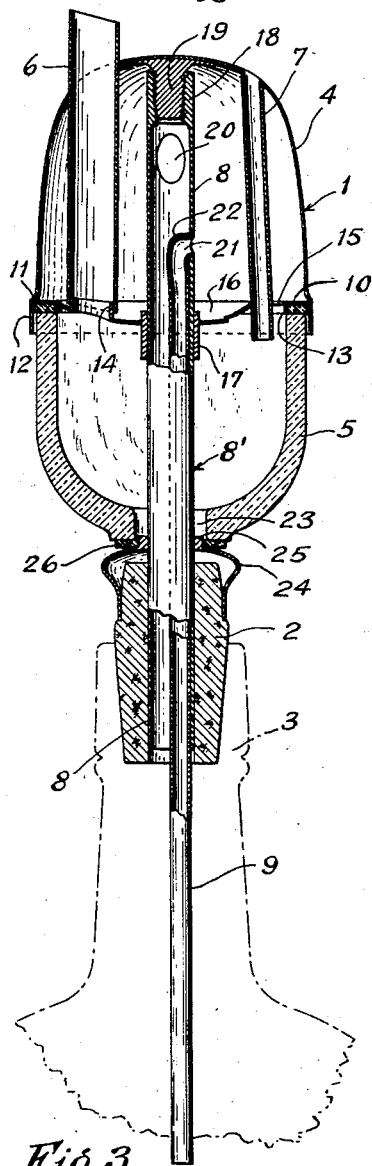
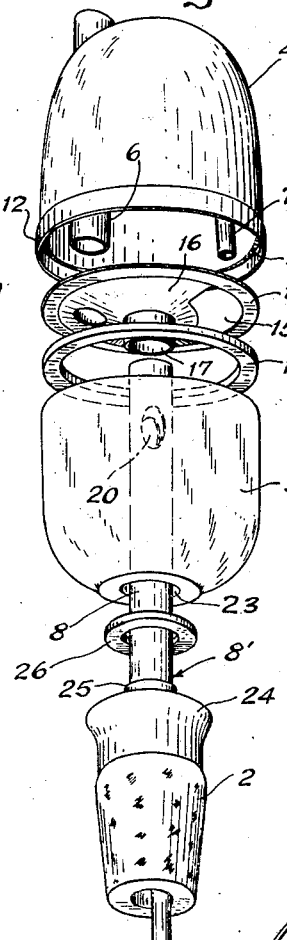
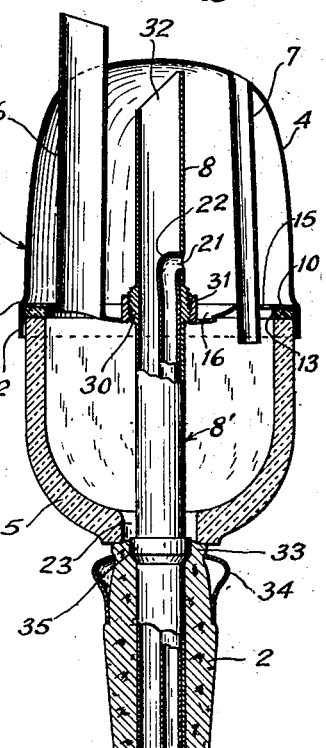
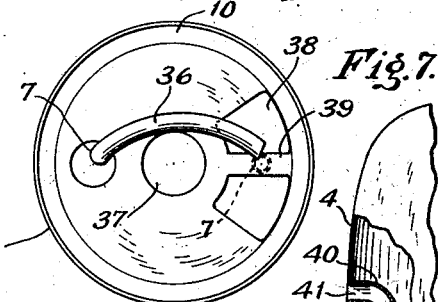
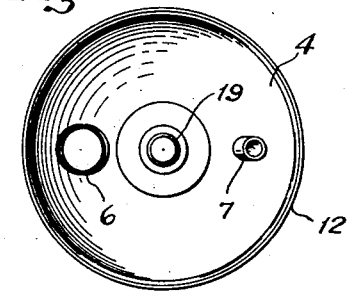
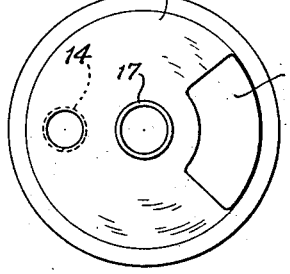
INVENTORS
EMIL A. SCHUELKE
AND JULIUS ROSS
BY
ATTORNEY.

Patented Aug. 29, 1933

1,924,809

UNITED STATES PATENT OFFICE 1,924,809

LIQUID MEASURING DEVICE

Emil A. Schuelke and Julius Ross, Meriden, Conn., assignors to The Napier Co., a corporation of Connecticut Application March 23, 1932. Serial No. 600,674

25 Claims. (Cl. 215—57)

This invention relates to liquid measuring devices.

It has for its object to provide an improved measuring device of the type adapted to be applied to a bottle or the like and to be used in measuring the flow therefrom. A further object is to provide an improved device of the type used in mixing beverages and adapted to supply a measured supply of liquid from a bottle to a glass or the like and also automatically refill the measuring receptacle, each time that the bottle is tilted over the glass. A further object of this invention is to provide an improved device of this type wherein, despite the fact that the beverage comes into contact with metal parts, it is made possible to overcome the markedly objectionable and sometimes dangerous results arising from some liquids, as, for example, those containing alcohol, being in contact with the metal. Further objects of this invention are to provide an improved construction adapted to enable all parts of the device to be readily accessible, and also to provide improved operatively connected and arranged parts adapted to enable the whole device to be quickly and conveniently taken apart and assembled, as, for example, whenever cleansing is desired. Still other objects are to provide an improved arrangement and connection of the parts whereby, at the same time that the above advantages are obtained which increase the safety and general cleanliness of the device, it is also made possible to produce the construction very economically and also to produce a rugged construction which is well adapted to withstand the demands of long service. These and other objects and advantages of this improved construction will, however, hereinafter more fully appear.

In the accompanying drawing we have shown, for purposes of illustration, four forms which the invention may assume in practice.

In the drawing,—

Fig. 1 is a vertical section through a measuring device of the improved construction, the same being shown for illustrative purposes in position on the neck of a bottle indicated in dotted lines;

Fig. 2 is a side elevation of the measuring device removed from the bottle, several parts of the measuring device being separated somewhat longitudinally to facilitate illustration;

Fig. 3 is a plan view of the metal measuring receptacle with its plate removed;

Fig. 4 is a separate plan view of the plate which is disposed in said receptacle;

Fig. 5 is a view similar to Fig. 1, but showing a modified construction;

Fig. 6 is an end view of the metal receptacle, but showing a modified construction of plate and modified vent pipe constructions, and Fig. 7 shows a still further modified construction of vent pipe.

Referring first to the construction shown in Figures 1 to 4, it will be noted that the whole measuring device when assembled forms a unit 1 having a cork 2 adapted to be inserted in the neck 3 of a bottle, and also having at its opposite end a metal measuring receptacle 4 above a glass measuring cup 5, while the receptacle 4 is provided with a pouring tube 6 and a vent tube 7, both communicating with the cup 5, and the cork 2 is provided with a tube 8 communicating with the receptacle 4 and extending down into the cork, and also with a tube 9 extending beyond the cork into the bottle.

Referring to the unit 1, it will be noted that the receptacle 4 and glass cup 5 thereof are separated by a plate 10 which in my improved construction is separate from the receptacle 4 and mounted between the elements 4 and 5 in such manner as to be readily removable. More particularly, it will be noted that this plate 10 is seated against an annular shoulder 11 at the upper end of a depending flange 12 on the member 4 and held against this shoulder by a rubber or other suitable compressible gasket 13 which is in turn compressed by the upper end of the glass cup 5. As shown, this plate 10 is also provided with an upstanding sleeve 14 adapted to be received snugly in the lower end of the pouring tube 6, and further is provided with an oppositely located segmental opening 15 through which the lower end of the vent tube 7 extends. Herein, it will also be noted that it is provided with a downwardly bowed center portion 16 carrying an axially disposed sleeve 17 therein, through which the tube 8 extends and is slidable. Thus it will be evident that before the assembly of the plate 10, the whole interior of the receptacle 4 is readily accessible for plating with a protective coating, as, for example, silver plate or the like. Further, it will be noted when the parts are assembled as shown in Fig. 1, with the tube 8 in position and the cup 5 pressed against the gasket 13, the parts unite to form a unit 1 which is readily separable whenever desired to permit access to the interior of the member 4, as, for example, for cleansing.

An improved construction of the tube 8 is also provided herein, whereby the latter forms an improved unit with the cork 2, and this unit, generally indicated at 8', acts as an improved unitary connecting means between the parts 4 and 5. Here it will be noted that the tube 8 extends from the bottom of the cork 2 through the sleeve 17 to a point adjacent the top of the receptacle 4. It is there provided inside its end with an axially threaded sleeve 18 attached to the inner wall of the tube 8 in any suitable manner. Herein, this sleeve 18 is threaded on a correspondingly threaded axially disposed depending member 19 inside the top of the member 4. While, if desired, this member 19 may be formed on the member 4, it is preferably formed separate from the member 4 and has a wide top suitably attached inside the latter, as, for example, by soldering. Further, it will be noted that the tube 8 is provided with a pair of oppositely located lateral apertures 20, preferably closely adjacent its upper end and as herein of substantial size and oval form. It will also be observed that the tube 8 is herein provided with a suitable lateral vent aperture 21, preferably of substantially smaller size than the apertures 20, and below the latter as illustrated. This aperture 21, in turn, also has a lateral elbow 22 on the upper end of the tube 9 suitably attached to the same in such manner as to form a connection between the inside of the receptacle 4 and the interior of the bottle. It will also be noted that, in this construction, the cork 2 is permanently connected to the tube 8 at a point below the usual bottom aperture 23 in the cup 5 through which the tube 8 extends. Herein, a metal cork covering and holding member or cap 24 is also provided with an upwardly extending frame 25 spaced above the top of the cork and suitably permanently connected to the tube 8, while the lower end of the member 24 securely grasps the upper end of the cork 2 in such manner as to prevent its separation therefrom. Here it will also be noted that a suitable compressible sealing gasket 26 surrounds this flange 25. Thus it will be evident that whenever the plate 10, gasket 13 and cup 5 are placed in the position illustrated in Fig. 1, and the tube unit, above described, has the upper end of the tube inserted as shown, and threaded on the portion 19, the parts will be effectively held together in the form of a unit 1, with the gaskets 13 and 26 suitably sealing the receptacles 4 and 5, while, whenever desired, the unit 1 may be separated into its constituent parts comprising the plate 10, the gasket 13, cup 5, and the tube unit comprising the connected tubes 8 and 9, the member 24, the cork 2, and gasket 26.

As regards the operation of the device, it will be evident that this construction will function generally in the manner common to devices of this type. More particularly, with the cup 5 filled with liquid, a new supply of liquid will be measured into the cup 4 as the liquid is poured out of the cup 5, and this new supply will be automatically supplied from the cup 4 to the cup 5 when the device, and the bottle 3 to which it is attached, are returned from the tilted pouring position to a normal upright position. During this operation, it will, of course, also be evident that the liquid from the cup 5 will flow out through the pouring tube 6, while the liquid from the bottle 3 will flow into the receptacle 4 through the tube 8 and its apertures 20, and the liquid will subsequently flow from the receptacle 4 into the cup 5 through the opening 15, suitable venting for the various operations at all times being provided through the tubes 7 and 9.

As a result of our improved construction, it will be evident that a markedly improved construction is produced, as compared with the constructions of the prior art, wherein both the plate between the metal receptacle and the glass cup, and all the tubes have been permanently connected and it has also been necessary to break a connection between the cork and the axial tube even to permit removal of the glass cup. For example, in manufacturing, the whole inside of the member 4 being readily accessible, all metal may be and is effectively plated in my improved construction in such manner as to protect the user. Further, it will be evident that, after assembly, access may be readily had at any time to the interior of the receptacle 4 in such manner as thereby to permit the whole interior of the receptacle 4 to be effectively cleansed from time to time and thus further minimize the possibility of difficulty arising from corrosion of the metal parts by the liquid. It will also be noted that the construction including the removable tube unit 8' and plate 10, is such as not only to permit the parts to be readily and inexpensively manufactured, but also to permit the unit to be readily and quickly disassembled for cleansing of the interior of the same. Attention is also directed to the fact that its structure is also such as to enable ready removal of particles of the bottle corks which may lodge therein. It will also be observed that as a result of my improved unitary tube and cork structure, wherein the cork can be permanently connected to the tube and forms a part of the unit and the whole unit is readily separable from the receptacle 4 by a simple turning movement, the previous difficulty arising from breaking of the parts associated with the cork is effectually overcome at the same time that an improved and inexpensive construction is made possible. These and other advantages of my improved construction will, however, be clearly apparent to those skilled in the art.

In Fig. 5 we have illustrated a modified construction which, while not preferred, may be used if desired. This construction, it will be noted, is generally similar to that previously described, save as regards the plate 10, the tube unit 8, and its connections. More particularly it will be noted that the plate 10 is suitably fixed in the receptacle 4, as by soldering, and that the outlet 6 is also soldered to this plate. Further, instead of threading the end of the tube 8 to the member 4, the tube herein is provided with a threaded sleeve 30 intermediate its ends and just below the outlet 21, and this sleeve is threaded in a correspondingly threaded axial sleeve 31 carried by the plate 10 and which herein is illustrated as projecting from the latter into the receptacle 4. It will also be noted that in this construction the tube 8 is provided with an end aperture 32 and that the end of the tube is cut off diagonally, as shown. As regards the lower end of the tube unit 8', it will also be noted that the cork 2 has a portion 33 which extends through a suitable large aperture in a cork cap 34 and is adapted to seal the lower end of the cup 5 when the tube 8 is threaded into place, as above described. Also, it will be noted that herein the tube 8 carries a shoulder portion 35 inside this portion 33 on the cork and has the cork suitably attached hereto and to the tube, as, for example, by cementing. Obviously the operation of this construction will be substantially the same as that heretofore described, while the parts 4 and 5 may be similarly readily separated or connected by removing or connecting the tube unit 8' comprising the threaded tube 8" and its associated cork.

In Fig. 6 we have also shown in full lines a modified vent construction which, if desired, may be used in lieu of the vent 7 in either of the above constructions. Herein, it will be noted that instead of providing a vent tube 7 spaced from the pouring tube 6, as in Figs. 1 and 5, the vent tube is disposed inside the pouring tube and has a lateral extension 36 on its bottom which is extended around the axial tube aperture 37 and has its open end adjacent the outlet from the metal receptacle. As shown herein, instead of having this outlet in the form of a single aperture, it may also be in the form of a plurality of apertures 38 spaced apart by a narrow metal strip 39. In this figure, we have also illustrated in dotted lines another alternative form of vent tube connection which may be used if desired in the constructions of Figs. 1 and 5, this construction comprising a tube similar to the tubes 7 therein, but having the lower end of the tube extending through and suitably attached to the portion 39. In Fig. 7 we have also shown a further modified arrangement of vent tube which may be used, if desired, the vent tube 7 in this construction being provided with a lateral elbow 40 which is attached around the inner periphery of a lateral aperture 41 disposed in an inconspicuous position in the side wall of the receptacle 4 adjacent the bottom of the latter.

While we have in this application specifically described certain forms of our invention herein, it will be understood that these forms of the same are used for illustrative purposes, and that the invention may be further modified and embodied in various other forms without departing from its spirit or the scope of the appended claims.

What we claim as new and desire to secure by Letters Patent is:—

1. Coaxial operatively connected separable measuring and pouring receptacles having an axial cork carrying tube and vent unit adjustable as a unit to connect said receptacles.

2. Coaxial operatively connected separable measuring and pouring receptacles having an axial cork carrying tube and vent unit adjustable as a unit to connect said receptacles and an apertured plate between said receptacles removable upon removal of said unit.

3. Coaxial operatively connected separable measuring and pouring receptacles having an axial cork carrying tube and vent unit adjustable as a unit to connect said receptacles, and an apertured plate between said receptacles removable upon removal of said unit and separable therefrom.

4. Coaxial operatively connected separable measuring and pouring receptacles having an axial cork carrying tube and vent unit adjustable as a unit to connect said receptacles and an apertured plate between said receptacles permanently attached to said measuring receptacle.

5. In a liquid measuring device, co-operating measuring and emptying receptacles having connections for filling and emptying the same upon tilting and for transferring the measured liquid to the emptying receptacle upon reverse tilting, and an axially adjustable tube connection forming a part of said connections and axially adjustable to connect said receptacles.

6. In a liquid measuring device, co-operating measuring and emptying receptacles having connections for filling and emptying the same upon tilting and for transferring the measured liquid to the emptying receptacle upon reverse tilting, and an axially adjustable tube connection forming a part of said connections axially adjustable to connect said receptacles and carrying a cork bodily adjustable with said tube connection.

7. In a liquid measuring device, co-operating measuring and emptying receptacles having connections for filling and emptying the same upon tilting and for transferring the measured liquid to the emptying receptacle upon reverse tilting, and a threaded tube connection forming a part of said connections and axially removable to separate said receptacles.

8. In a liquid measuring device, co-operating measuring and emptying receptacles having connections for filling and emptying the same upon tilting and for transferring the measured liquid to the emptying receptacle upon reverse tilting, and a threaded tube connection forming a part of said connections axially adjustable to connect said receptacles and carrying a cork bodily adjustable with said tube connection.

9. In a liquid measuring device, co-operating receptacles having connections for filling and emptying the same upon tilting and transferring the liquid from one to another upon reverse tilting and including in said connections an axially adjustable tube connection connecting the receptacles and an apertured plate between said receptacles and relative to which said tube connection is adjustable.

10. In a liquid measuring device, co-operating receptacles having connections for filling and emptying the same upon tilting and transferring the liquid from one to another upon reverse tilting and including in said connections an axially adjustable tube connection connecting the receptacles and an apertured plate between said receptacles relative to which said tube connection is adjustable and removable at will upon removal of said tube connection.

11. In a liquid measuring device, co-operating operatively connected measuring and emptying receptacles having an axially adjustable tube connection connecting the receptacles, an apertured plate between said receptacles relative to which said tube connection is adjustable and removable upon removal of said tube connection, and threaded connections for said tube connection.

12. In a liquid measuring device, co-operating receptacles having connections for filling and emptying the same upon tilting and transferring the liquid from one to another upon reverse tilting, including a removable plate between said receptacles, and means connecting said receptacles and separable to permit removal of said plate.

13. In a liquid measuring device, co-operating receptacles having connections for filling and emptying the same upon tilting and transferring the liquid from one to another upon reverse tilting, including a removable plate between said receptacles, and means connecting said receptacles separable to permit removal of said plate and movable at will axially in opposite directions through said plate.

14. In a liquid measuring device, co-operating receptacles having connections for filling and emptying the same upon tilting and transferring the liquid from one to another upon reverse tilting, including a removable plate between said receptacles, and means connecting said receptacles separable to permit removal of said plate including an axial connection having a threaded connection to one of said receptacles and a sealing connection for the other.

15. A liquid measuring device comprising co-operating receptacles, one carrying a vent and pouring outlet for the other, a plate between said receptacles providing communication from one to another and to said pouring outlet, and a cork carrying tube unit carrying filling and venting means for one of said receptacles and longitudinally adjustable relative to both of said receptacles to connect the same together.

16. A liquid measuring device comprising co-operating receptacles, one carrying a vent and pouring outlet for the other, a plate between said receptacles providing communication from one to another and to said pouring outlet, and a cork carrying tube unit carrying filling and venting means for one of said receptacles longitudinally adjustable relative to both of said receptacles to connect the same together and having a threaded connection to the receptacle most remote from its cork.

17. A liquid measuring device comprising co-operating receptacles, one carrying a vent and pouring outlet for the other, a plate between said receptacles providing communication from one to another and to said pouring outlet, and a cork carrying tube unit carrying filling and venting means for one of said receptacles longitudinally adjustable relative to both of said receptacles to connect the same together and having a threaded end threaded on the receptacle most remote from the cork.

18. A tube connection for measuring devices having independent coaxially connectible upper and lower receptacles, which comprises a tube having an outlet adapted to open into the upper receptacle, a vent tube permanently disposed within said first mentioned tube and venting through a side wall port therein spaced from said outlet, a cork surrounding said first tube and fixedly attached thereto, abutment means carried by said cork and adaped to abut the bottom of the lower receptacle, and means for detachably connecting said first mentioned tube to the upper receptacle and adapted to co-operate with said abutment means to connect the receptacles.

19. A tube connection for liquid measuring devices comprising an outer tube having an outlet, a vent tube in said outer tube connected thereto, and having a lateral vent opening through said outer tube below said outlet, a cork connected to said first mentioned tube and surrounding both of said tubes, and a threaded connection spaced longitudinally from said cork and said lateral opening and carried by said first mentioned tube.

20. A tube connection for liquid measuring devices comprising an outer tube having an outlet, a vent tube in said outer tube connected thereto and having a lateral vent opening through said outer tube below said outlet, a cork connected to said first mentioned tube and surrounding both of said tubes, and a threaded connection spaced longitudinally from said cork and said lateral opening and carried by said first mentioned tube, said threaded connection being on the opposite side of said outlet from the adjacent end of said vent tube.

21. A tube connection for liquid measuring devices comprising an outer tube having an outlet, a vent tube in said outer tube connected thereto and having a lateral vent opening through said outer tube below said outlet, a cork connected to said first mentioned tube and surrounding both of said tubes, and a threaded connection spaced longitudinally from said cork and said lateral opening and carried by said first mentioned tube, said threaded connection being disposed axially within the extremity of said first mentioned tube.

22. A tube connection for liquid measuring devices comprising an outer tube having an ouelet, a vent tube in said outer tube connected thereto and having a lateral vent opening through said outer tube below said outlet, a cork connected to said first mentioned tube and surrounding both of said tubes, and a threaded connection spaced longitudinally from said cork and said lateral opening and carried by said first mentioned tube, said threaded connection being on the exterior of said first mentioned tube and between the vent tube outlet and said cork.

23. In a liquid measuring device having co-operating receptacles, a tube having a portion connectible to one of said receptacles, a cork fixed on said tube below said portion, and a cork cap carried on the upper end of said cork and having a flange connected to said tube and forming an abutment engaging the other receptacles.

24. In a liquid measuring device having co-operating receptacles, a tube having a portion connectible to one of said receptacles, a cork fixed on said tube below said portion, a cork cap carried on the upper end of said cork and having a flange connected to said tube and forming an abutment engaging the other receptacle, and a compressible gasket carried on the top of said cap and forming a seal surrounding said flange.

25. A tube and cork connection for liquid measuring devices comprising a tube, a cork carried thereon, and a cork cap carried on the upper end of said cork and having a portion of said cork protruding axially through said cap and forming a seal surrounding said tube.

EMIL A. SCHUELKE.
JULIUS ROSS.